United States Patent
Kise

[11] Patent Number: 6,158,915
[45] Date of Patent: Dec. 12, 2000

[54] ATTACHMENT MEMBER FOR BOARD MATERIALS

[75] Inventor: Kazuhiko Kise, Tokyo, Japan

[73] Assignee: Fukuvi Chemical Industry Co., Ltd., Fukui-Ken, Japan

[21] Appl. No.: 09/150,598

[22] Filed: Sep. 10, 1998

[30] Foreign Application Priority Data

Sep. 12, 1997 [JP] Japan .................................. 9-249050

[51] Int. Cl.$^7$ ...................................................... F16B 1/00
[52] U.S. Cl. ..................... 403/309; 403/404; 403/305; 403/206; 403/2; 52/396.04; 52/469; 52/506.05; 52/774
[58] Field of Search ................................. 403/309, 404, 403/300, 305, 206, 2; 52/396.04, 465, 469, 506.05, 404.1, 769, 774

[56] References Cited

U.S. PATENT DOCUMENTS

| | | | |
|---|---|---|---|
| 479,275 | 7/1892 | Heywood | 52/395 |
| 2,150,497 | 3/1939 | Fernberg | 24/458 X |
| 2,258,314 | 10/1941 | Bonnell | 52/273 |
| 3,039,232 | 6/1962 | Dunn | 52/396.04 X |
| 3,478,479 | 11/1969 | Paplia | 52/361 |
| 4,913,576 | 4/1990 | Grant, Jr. | 403/300 X |
| 4,995,605 | 2/1991 | Conville | 52/489 X |

*Primary Examiner*—Lynne H. Browne
*Assistant Examiner*—Ernesto Garcia
*Attorney, Agent, or Firm*—Biebel & French

[57] ABSTRACT

An attachment member 11 for board materials 2 such as heat insulating materials and the like comprises an affixing plate part 5 which is affixed to the substrate surface 3a of a body 3, a support plate part 6 which extends approximately perpendicularly with respect to the substrate surface 3a when the affixing plate part 5 is affixed to the substrate surface 3a, and connecting plate parts 7 which extend in both directions at the upper end of support plate part 6. A support plate part elasticity providing part 12 and connecting plate part elasticity providing parts 13 are provided, respectively, in the support plate part 6 toward the point of connection with the affixing plate part 5, and in the connecting plate parts 7 toward the point of connection with the support plate part 6, along the longitudinal direction, and bent so as to achieve a wave form in cross-section. By affixing the affixing plate part 5 to the substrate surface 3a, the support plate part 6, the connecting plate parts 7, and the substrate surface 3a form connecting cavity parts 8, and by engaging end parts of board materials 2 therein, the board materials 2 are attached to the substrate surface 3a.

By means of this, it is possible to easily attach board materials such as insulating boards or the like to the substrate surface of a body or the like.

13 Claims, 5 Drawing Sheets

PRIOR ART

ATTACHMENT MEMBER FOR BOARD MATERIALS

FIELD OF THE INVENTION

The present invention relates to an attachment member for board materials which serves to connect the lead ends of board materials and attach these to the surface of a substrate such as a body or the like.

BACKGROUND ART

Commonly, an attachment member 1 for board materials such as that shown in FIG. 5 is employed when board materials such as heat insulating boards or the like are attached to a body.

This attachment member 1 for board materials is provided with an affixing plate part 5, a support plate part 6, which extends approximately perpendicularly from the affixing plate part 5, and a connecting plate part 7, which is provided at the upper end of support plate part 6, and extends in both directions so as to be parallel with the affixing plate part 5. The affixing plate part 5 is affixed by means of nails 4 or the like to the substrate surface 3a of a body 3 or the like to which board materials 2 such as heat insulating boards or the like are to be attached.

Additionally, the space enclosed by connecting plate part 7, support plate part 6, and substrate surface 3a forms a connecting cavity part 8 into which the lead ends of board materials 2 are fitted.

The attachment member 1 is affixed to the substrate surface 3a of a body 3, and the lead ends of board materials 2 are engaged in connecting cavity parts 8 which are formed between the connecting plate part 7 and the substrate surface 3a of body 3, and thereby, the lead ends of the board materials 2 are connected by means of connecting plate part 7 and become attached to the substrate surface 3a of the body 3.

Connecting projections 7a, which project to the side facing connecting cavity part 8, are formed at the lead end parts of connecting plate part 7 so as to extend in the longitudinal direction thereof.

Additionally, in the attachment member 1 having the form described above, when the board materials 2 are engaged in the connecting cavity parts 8, the connecting plate parts 7 must be pulled slightly in the direction of separation from substrate surface 3a, so as to widen connecting cavity part 8, so that this causes a problem in that a large amount of effort is required for this operation.

In particular, in the state in which the lead end of a board material 2 is already engaged in the connecting cavity part 8 of one side, when the end part of another board material 2 is engaged in the connecting cavity part 8 of the other side, as a result of the board material 2 which was previously engaged, it becomes extremely difficult to widen the connecting cavity part 8 on the side in which engagement is to take place, and this causes a problem in that it increases the complexity of the attachment operation.

Moreover, as shown in FIG. 6, when such attachment members 1 are employed, gaps are formed between the attachment members 1A which are arranged vertically and the attachment members 1B which are arranged horizontally between the attachment members 1A which were arranged vertically, and this causes a problem in that the outward appearance is negatively affected.

Accordingly, the present invention has as an object thereof to provide an attachment member for board materials which is capable of attaching, in an extremely simple manner, board materials such as heat insulating boards or the like to the surface of a substrate such as a body or the like.

SUMMARY OF THE INVENTION

The attachment member for board materials of the present invention is provided with: an affixing plate part which is affixed to the substrate surface of a body; a support plate part which extends approximately perpendicularly with respect to the substrate surface when the affixing plate part is affixed to the substrate surface; connecting plate parts, which extend in both directions at the upper end of the support plate part and which form, together with the support plate part and the substrate surface, connecting cavity parts which are capable of accepting and connecting end parts of board materials; and an elasticity providing part which is provided in one or both connecting plate parts along the longitudinal direction thereof and which provides elasticity to the connecting plate parts.

Accordingly, when the end part of a board material is engaged in the connecting cavity part, the connecting plate part is easily elastically deformed in a direction of separation from the substrate surface, and it is possible to widen the connecting cavity part. By means of this, it is possible to conduct, in an extremely simple manner, the engagement of the end parts of board materials with the connecting cavity parts, and it is thus possible to greatly improve the efficiency of the board material attachment operation.

In particular, in the state in which the end part of a board material is engaged in the connecting cavity part on one side, even when the end part of a board material is to be engaged in the end part of the connecting cavity part on the other side, it is easily possible to conduct the elastic deformation of the connecting plate part which forms the connecting cavity part on the other side in a direction of separation from the substrate surface, and thus to widen the connecting cavity part, so that it is a simple matter to conduct the engagement of the end part of a board material in the connecting cavity part on the other side.

DETAILED DESCRIPTION OF THE PREFERRED EMBODIMENTS OF THE PRESENT INVENTION

Hereinbelow, embodiments of the attachment member for board materials in accordance with the present invention will be explained. Structural parts which are identical to those in the conventional technology will be given identical reference numbers, and an explanation thereof will be omitted here.

Figure 1:
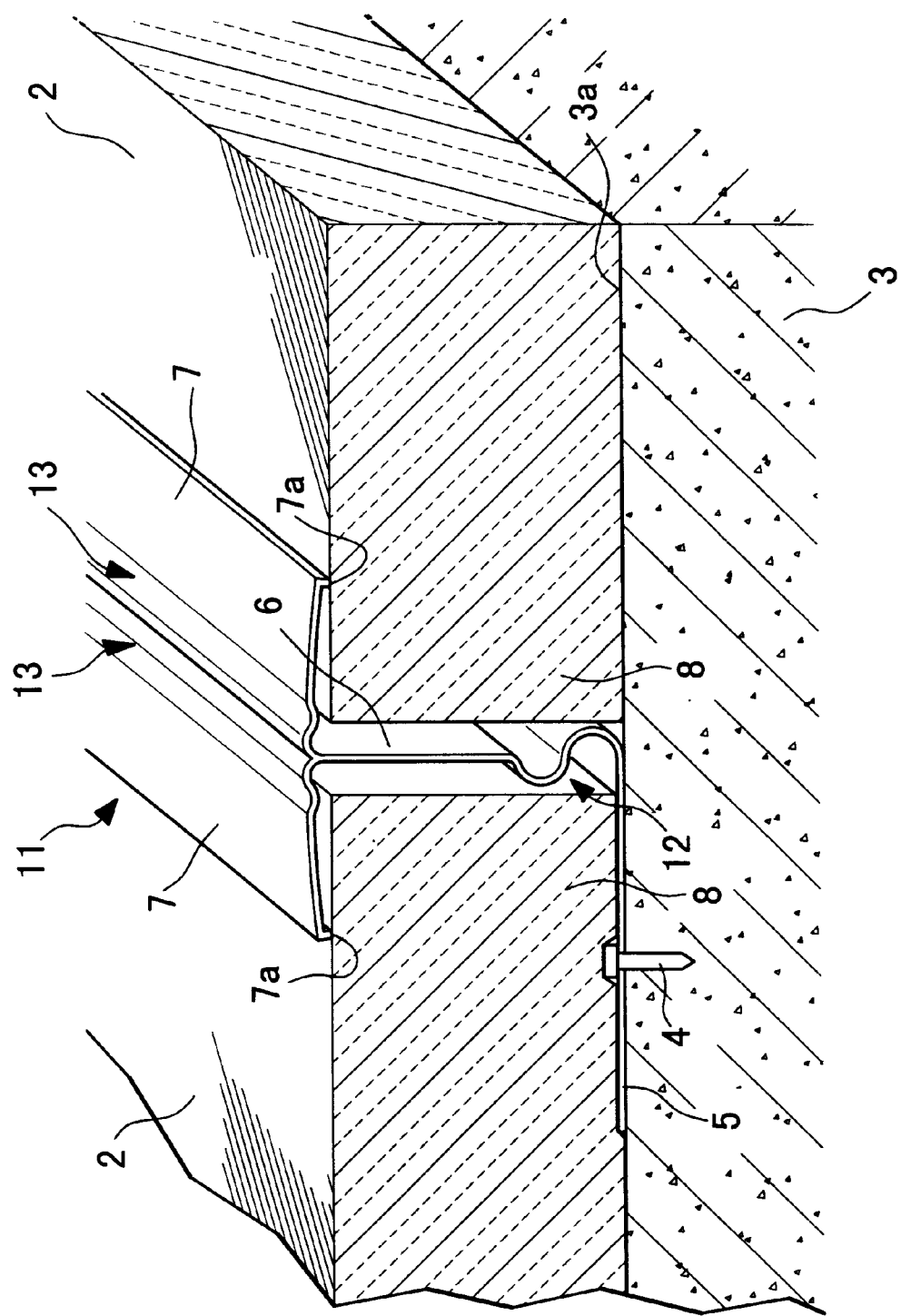
FIG. 1 is a perspective view of an attachment member in a state in which board materials are attached to the substrate surface of a body, which serves to explain the structure and form of an attachment member for board materials in accordance with an embodiment of the present invention.
Figure 2:
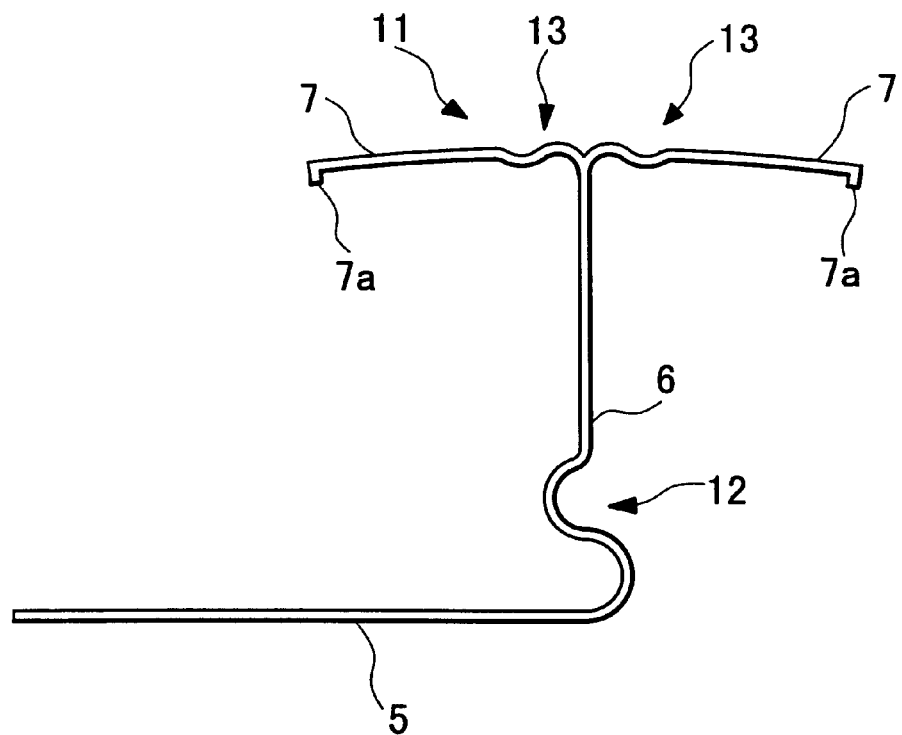
FIG. 2 is a side view of the attachment member which serves to explain the structure and form of an attachment member for board materials in accordance with an embodiment of the present invention.

In FIGS. 1 and 2, reference 11 indicates an attachment member. This attachment member 11 may be formed from, for example, a synthetic resin such as plastic or the like, or from metal plates comprising, for example, aluminum or the like. In this attachment member 11, a support plate part elasticity providing part (elasticity providing part) 12 is formed in the support plate part 6 which extends from affixing plate part 5. Support plate part elasticity providing part 12 is formed towards the point of coupling with the affixing plate part 5 along the longitudinal direction.

This support plate part elasticity providing part 12 is formed so as to provide support plate part 6 with a curved wave form in cross-section. Additionally, as a result of this support plate part elasticity providing part 12, elasticity is provided in support plate part 6 in the direction of intersection with the plane.

Connecting plate part elasticity providing parts (elasticity providing parts) 13 are formed, respectively, in the connecting plate parts 7 of the attachment member 11. Connecting plate part elasticity providing parts 13 are formed, respectively, toward the points of coupling with the support plate part 6 along the longitudinal direction.

These connecting plate part elasticity providing parts 13 are also formed so as to provide connecting plate parts 7 with a curved wave form in cross-section, as is the case with the support plate part elasticity providing part 12 described above. In addition, as a result of these connecting plate part elasticity providing parts 13, elasticity is provided in the connecting plate parts 7 in the direction of intersection with the plane.

When the affixing plate part 5 is attached to the surface substrate 3a of the body 3, the connecting plate parts 7 of the attachment member 11 curve slightly toward the connecting cavity parts 8 which are enclosed by the connecting plate parts 7, support plate part 6, and substrate surface 3a.

Figure 3:
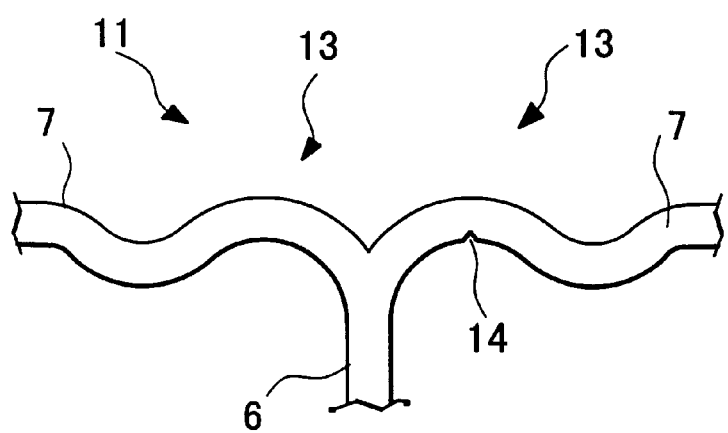
FIG. 3 is a partial side view which serves to explain the structure and form of an attachment member for board materials in accordance with an embodiment of the present invention.

Furthermore, as shown in FIG. 3, a notched part 14 extending in the longitudinal direction is formed in the connecting plate part 7 extending in the opposite direction from that in which the affixing plate part 5 extends, in the surface facing the connecting cavity part 8 and in the vicinity of the point of connection with the support plate part 6.

Next, the case will be explained in which board materials 2 comprising board materials 2 are attached to the substrate surface 3a of a body 3 using an attachment member 11 for board materials having the structure described above.

First, the attachment member 11 to be attached to the substrate surface 3a of the body 3 is attached by affixing the affixing plate part 5 to the substrate surface 3a of the body 3 using nails 4 or the like.

When this is done, a connecting cavity part 8 is formed by the connecting plate part 7 and support plate part 6 of the attachment member 11 attached to the substrate surface 3a, as well as the substrate surface 3a of the body 3.

Next, end parts of board materials 2 are connected by being engaged, one at a time, in the connecting cavity parts 8 formed by the attachment of the attachment member 11 to the substrate surface 3a which was described above.

First, when the end part of a board material 2 is engaged in the connecting cavity part 8 on one side, in order to widen the connecting cavity part 8 on the engaging side, the connecting plate part 7 forming the connecting cavity part 8 on the engaging side is lifted in the direction of separation from the substrate surface 3a.

Here, the connecting plate part elasticity providing parts 13 and the support plate part elasticity providing part 12 are formed in the connecting plate parts 7 and support plate part 6, respectively, of the attachment member 11, and elasticity is thus provided in the direction of intersection with the respective surfaces, so that it is easily possible to widen the connecting cavity part 8, and it is possible to conduct, in an extremely simple manner, the engagement of the end part of board material 2.

Next, the case will be explained in which the end part of a board material 2 is engaged in the connecting cavity part 8 on the other side.

The end part of a board material 2 is already engaged in the connecting cavity part 8 on one side, and thereby, the support plate part 6 of the attachment member 11 is not easily susceptible to elastic deformation; however, elasticity is provided in the direction of intersection with the plane by means of the connecting plate part elasticity providing parts 13 formed in the connecting plate parts 7, so that it is comparatively easy to carry out the elastic deformation of these connecting plate parts 7, and by means of this, it is a simple matter to conduct the engagement of the lead end of a board material 2 with the connecting cavity part 8 on the other side, as well.

In this way, in accordance with the attachment member of the embodiment described above, connecting plate part elasticity providing parts 13, which are formed by bending with a cross-sectional wave form shape near the point of connection with the support plate part 6, are formed in the connecting plate parts 7 which are connected with the end parts of board materials engaged in connecting cavity parts 8, and elasticity is provided in these connecting plate parts 7 in the direction of intersection with the plane, so that when the end part of a board material 2 is engaged in the connecting cavity part 8, which is formed by a connecting plate part 7, the support plate part 6, and the substrate surface 3a of the body 3, and which engages the end part of a board material 2, the connecting plate part 7 is easily subject to elastic deformation in the direction of separation from the substrate surface 3a, and it is thus possible to widen the connecting cavity part 8. By means of this, it is an extremely simple matter to conduct the engagement of the end part of a board material 2 in the connecting cavity part 8, and it is thus possible to greatly improve the efficiency of the attachment operation of the board material 2.

In particular, even if the end part of a board material 2 is to be engaged in the end part of a connecting cavity part 8 on the other side, in the case in which an end part of a board material 2 has previously been engaged in the connecting cavity part 8 on one side, it is a simple matter to conduct the elastic deformation of the connecting plate part 7 forming the connecting cavity part 8 on the other side in the direction of separation from the substrate surface 3a, and thus to widen the connecting cavity part 8, so that it is a simple matter to conduct the engagement of the end part of a board material 2 in the connecting cavity part 8 on the other side, as well.

Furthermore, as a result of the support plate part elasticity providing part 12 which is provided in the support plate part 6 toward the position of connection with affixing plate part 5, elasticity is provided in support plate part 6 in the direction of intersection with the plane, so that it is easy to cause inclination with respect to the substrate surface 3a of the body 3 to which the affixing plate part 5 is affixed, and when a board material 2 is engaged in connecting cavity part 8, this permits a further widening of the connecting cavity part 8 and a further simplification of the attachment operation of the board material 2.

Moreover, the connecting plate parts 7 forming the attachment 11 are slightly bent toward the respective connecting cavity parts 8, and thus the connection force applied to the end parts of board materials 2 engaged in connecting cavity parts 8 is increased, so that it is possible to maintain a satisfactory connection state of the board materials 2 by means of these connecting plate parts 7.

Furthermore, in accordance with the attachment member 11, as a result of the connecting plate part elasticity providing parts 13 and support plate part elasticity providing part 12 formed in, respectively, the connecting plate parts 7 and the support plate part 6, it is easily possible to widen the connecting cavity parts 8, so that it is possible to engage the lead ends of the attachment member 11 in these connecting cavity parts 8, as well.

Figure 4:
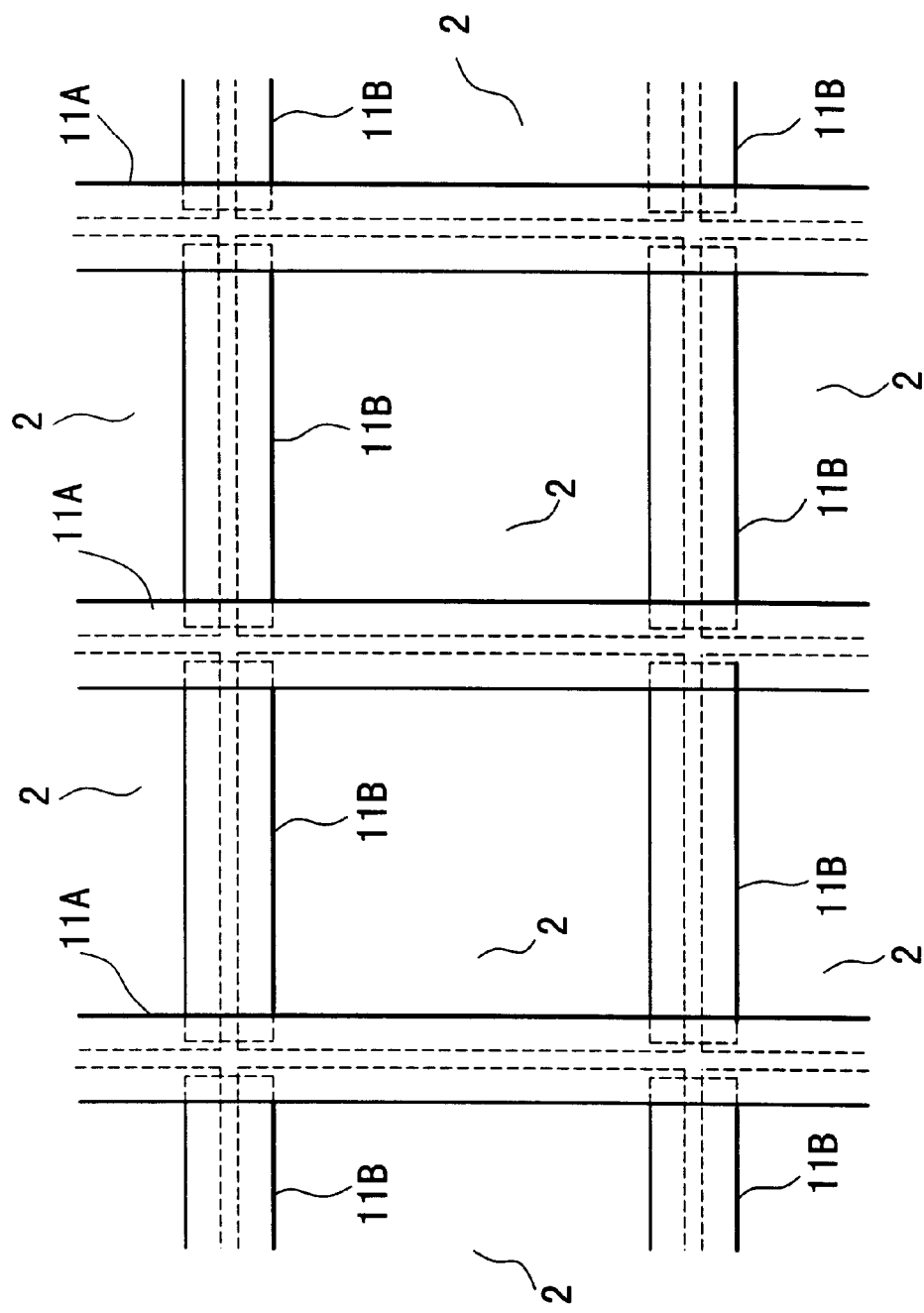
FIG. 4 is a top view of attached board materials which serves to explain the attachment method for board materials utilizing an attachment member for board materials in accordance with an embodiment of the present invention.
Figure 5:
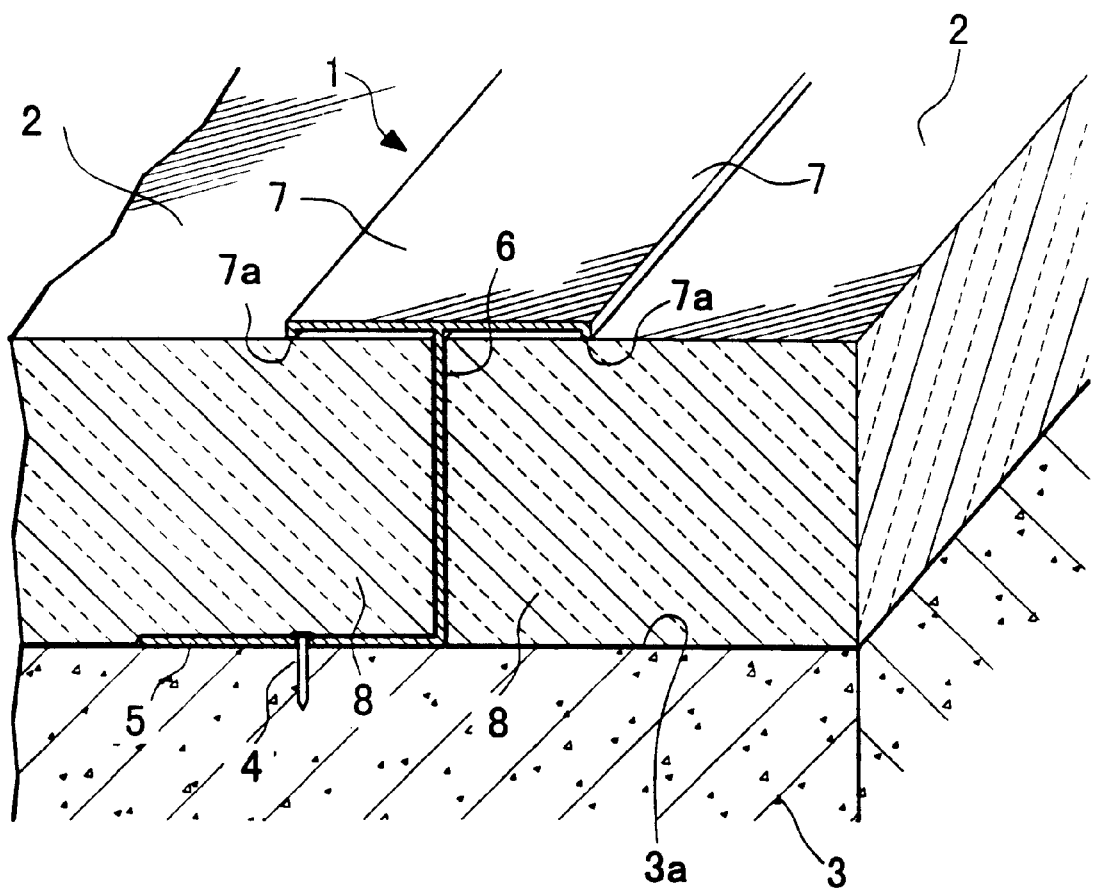
FIG. 5 is a perspective view of an attachment member in a state in which board materials are attached to the substrate surface of a body, which serves to explain the structure and form of a conventional attachment member for board materials.
Figure 6:
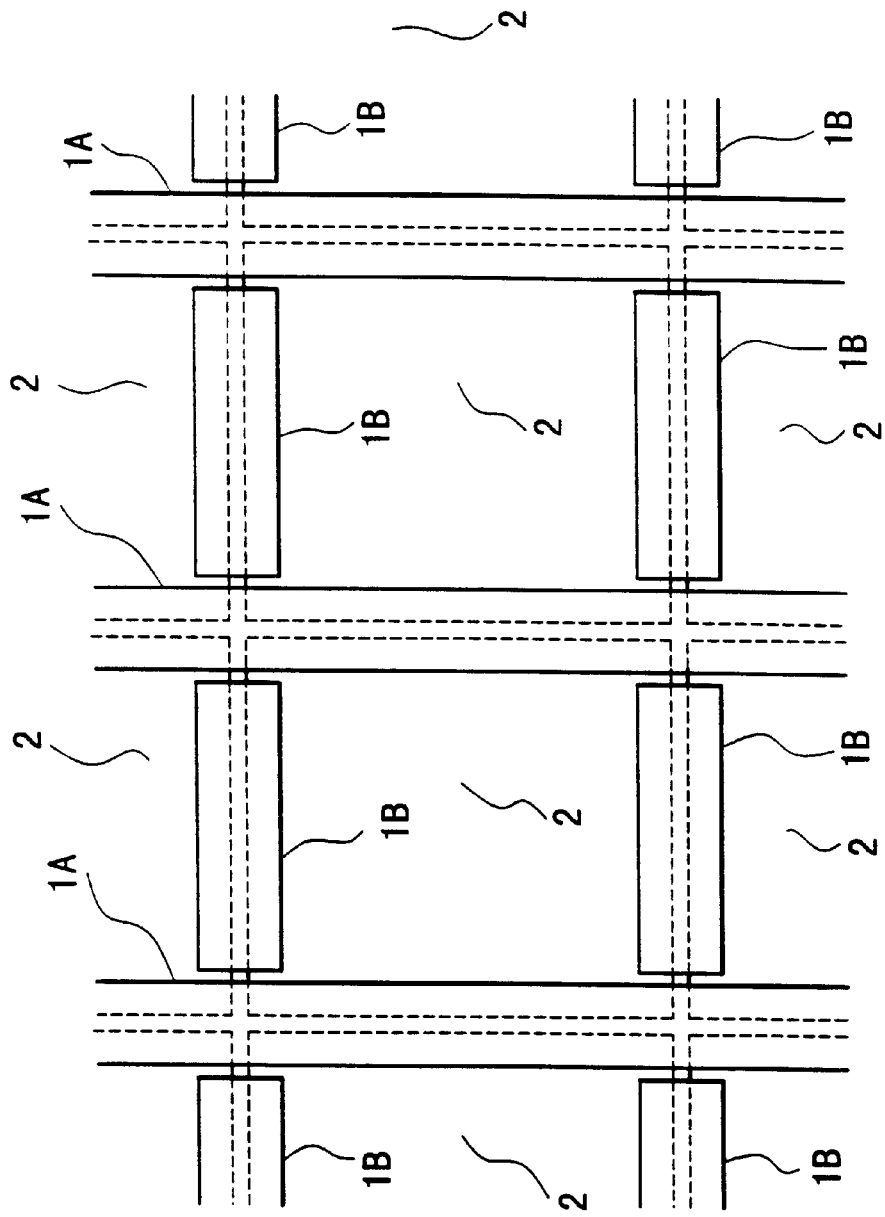
FIG. 6 is a top view of attached board materials which serves explain the attachment method for board materials utilizing a conventional attachment member for board materials.

By means of this, as shown in FIG. 4, attachment members 11B are arranged horizontally between attachment members 11A, which are arranged vertically, and when these connect the peripheries of board materials 2, the end parts of attachment members 11B which are arranged horizontally can be engaged in the connecting cavity parts 8 of the attachment members 11A which are arranged vertically. By means of this, there is no formation of a gap between the attachment members 11A which are arranged vertically and the attachment members 11B which are arranged horizontally, and it is thus possible to preserve an attractive outward appearance.

Furthermore, when there are openings such as windows or the like in the body 3, and attachment of the board materials 2 is unnecessary at one side of an attachment member 11, it is possible to cut off and remove the connecting plate part 7 which extends on the opposite side from affixing plate part 5 along the notch part 14. By means of this, it is possible to install board materials 2 up to the vicinity of the window opening.

In the embodiment described above, the support plate part elasticity providing part 12 and the connecting plate part elasticity proving parts 13 formed in the support plate part 6 and the connecting plate parts 7 were depicted so as to be formed with a wave form bent into a S shape; however, it is of course the case that a saw-toothed shape or an angled shape may also be used for the shape of this wave form.

What is claimed is:

1. An attachment member for board materials comprising with:

an affixing plate part for affixing to a substrate surface of a body;

a support plate part, which extends approximately perpendicularly with respect to said affixing plate part, said support plate part including an elasticity providing part provided in said support plate part along the longitudinal direction;

connecting plate parts, which extend in both directions at the upper end of said support plate part and which, together with said affixing plate part, form connecting cavity parts which are capable of engaging with and connecting end parts of board materials; and elasticity providing parts which are provided in one or both of said connecting plate parts along the longitudinal direction, and which provide elasticity to said connecting plate parts.

2. An attachment member for board materials in accordance with claim 1, wherein said elasticity providing parts which are provided in one or both of said connecting plate parts are formed so that said connecting plate parts have a wave form in cross-section.

3. An attachment member for board materials in accordance with claim 1, wherein said elasticity providing parts which are provided in one or both of said connecting plate parts are formed so that said connecting plate parts have a saw-tooth shape in cross-section.

4. An attachment member for board materials in accordance with claim 1, wherein said elasticity providing parts which are provided in one or both of said connecting plate parts are formed so that said connecting plate parts have an angled shape in cross-section.

5. An attachment member for board materials in accordance with claim 1, wherein said elasticity providing parts which are provided in one or both of said connecting plate parts are formed near points of connection with said support plate part.

6. An attachment member for board materials in accordance with claim 1, wherein said elasticity providing part provided in said support plate is formed so that said support plate has a wave form shape in cross-section.

7. An attachment member for board materials in accordance with claim 1, wherein said elasticity providing part provided in said support plate is formed so that said support plate has a saw-tooth shape in cross-section.

8. An attachment member for board materials in accordance with claim 1, wherein said elasticity providing part provided in said support plate is formed so that said support plate has an angle shape in cross-section.

9. An attachment member for board materials in accordance with claim 1, wherein said elasticity providing part provided in said support plate is provided near the point of connection with said affixing plate part.

10. An attachment member for board materials in accordance with claim 1, wherein a notched part is provided in said connecting plate part along the longitudinal direction thereof and in the vicinity of a point of connection with said support plate part.

11. An attachment member for board materials in accordance with claim 1, wherein said connecting plate parts are slightly bent toward said connecting cavity parts.

12. An attachment member for board materials in accordance with claim 1, wherein connecting projections which project toward said connecting cavity parts are formed in said connecting plate parts at end parts thereof.

13. An attachment member for board materials in accordance with claim 1, wherein board materials engaged in said connecting cavity parts are heat insulating materials.

* * * * *